United States Patent
Hedstrom

[11] 3,762,992
[45] Oct. 2, 1973

[54] LASER-DRIVEN FUSION REACTOR
[75] Inventor: James C. Hedstrom, Los Alamos, N. Mex.
[73] Assignee: The United States of America as represented by the United States Atomic Energy Commission, Washington, D.C.
[22] Filed: Mar. 1, 1972
[21] Appl. No.: 230,863

[52] U.S. Cl. .................................................. 176/1
[51] Int. Cl. .......................................... G21b 1/00
[58] Field of Search ........................................ 176/1

[56] References Cited
UNITED STATES PATENTS
3,624,239  11/1971  Fraas .................................... 176/1
FOREIGN PATENTS OR APPLICATIONS
855,859  12/1960  Great Britain ......................... 176/1

Primary Examiner—Reuben Epstein
Attorney—Roland A. Anderson

[57] ABSTRACT

A laser-driven fusion reactor consisting of concentric spherical vessels in which the thermonuclear energy is derived from a deuterium-tritium (D+T) burn within a "pellet," located at the center of the vessels and initiated by a laser pulse. The resulting α-particle energy and a small fraction of the neutron energy are deposited within the pellet; this pellet energy is eventually transformed into sensible heat of lithium in a condenser outside the vessels. The remaining neutron energy is dissipated in a lithium blanket, located within the concentric vessels, where the fuel ingredient, tritium, is also produced. The heat content of the blanket and of the condenser lithium is eventually transferred to a conventional thermodynamic plant where the thermal energy is converted to electrical energy in a steam Rankine cycle.

This invention was made in the course of, or under, a contract with the U.S. ATOMIC ENERGY COMMISSION.

6 Claims, 2 Drawing Figures

LASER-DRIVEN FUSION REACTOR

BACKGROUND OF THE INVENTION

For a D+T-burning plant there are two essential requirements: (1) the need to produce tritium artificially because natural supplies are insufficient to support a large-scale power-generation industry, and (2) the need to convert the 14-MeV neutron energy into usable form because there is no known means of using the energy of 14-MeV neutrons directly except by transforming this energy into thermal energy of another substance. Both requirements are satisfied by providing a "blanket" of lithium which surrounds the source of D+T energy. Tritium is generated in a major fraction of reactions between neutrons and lithium; and lithium, being a light element, also converts neutron kinetic energy to thermal energy by means of elastic-scattering reactions. Furthermore, additional thermal energy is produced by neutrons absorbed in the lithium. It is essential that at least as much tritium be generated as is burned and lost and that as much as possible of the neutron energy be converted into thermal energy. Fortunately, tritium breeding ratios in a lithium blanket can be relatively high—in the range of 1.2 to 1.6—which would provide a large operating margin to a reactor plant. However, because tritium losses will of necessity be small, the plant will operate normally at a breeding ratio only slightly greater than unity to prevent unnecessary buildup of tritium reserves, although the plant can operate temporarily with a high breeding ratio to build up a fuel inventory for a new plant. Because the major fraction of the D+T energy will be converted in the blanket to thermal energy, the dominant method of converting thermal energy to electricity will probably be by means of a heat engine in a thermodynamic cycle. Such a cycle will be used merely because it offers the highest conversion efficiency in the temperature range in which normal engineering materials can operate. A major design problem in containing this blast energy is posed by the need for a low-pressure cavity in which the pellet can be initiated by a laser pulse without prohibitive laser-energy loss along its path, while, at the same time, maintaining a finite layer of blanket material that surrounds the pellet.

In the Blascon concept developed at Oak Ridge National Laboratory, the cavity is defined by the vortex of a swirling liquid blanket which is filled with gas bubbles, providing a compressible but dense medium to attenuate the blast shock arriving at the containing pressure-vessel wall.

Another method of defining the cavity region is to separate the cavity from the blanket by a solid wall. One significant advantage to the solid-wall concept as opposed to concepts with no wall is that the cavity region is well defined and thus amenable to analysis. Another advantage, which may be even more important, is the possibility of providing a passage by mechanical means for exhausting the hot gases from the cavity prior to the next shot. In the absence of a solid wall to define the cavity, much blanket lithium would be swept out of the vessel as these gases exhaust. The alternative approach, i.e., allowing these gases to condense in the blanket lithium, would take an excessively long time between shots. In the solid-wall concept, the inner surface of the wall must be protected from the damaging effects of the blast to prevent vaporization of the wall material by thermal radiation and erosion by high-velocity material, both of which emanate from the fuel pellet. Liquid lithium is used to form a protective layer on the inner cavity wall.

SUMMARY OF THE INVENTION

Three general features are essential to the laser-driven fusion reactor of this invention: a cavity within which to detonate the pellet, a pressure vessel to contain the blast, and a thick blanket containing lithium to convert the fast-neutron energy into heat and into tritium fuel. However, within these constraints there remains a wide latitude within which to design the reactor. The reactor of this invention uses a solid wall to separate the reaction cavity from the lithium blanket. The main design problems then become those of providing for the protection from the direct effects of the blast. This protection can be afforded by a thin layer of ablative material which, as it vaporizes, absorbs the energy of radiation and impact from the pellet. A layer of lithium, wetting the inside of the wall, should furnish this protection. If the wall is porous, the lithium layer can be restored after each pulse by a radial inflow of lithium from the blanket region.

A second design problem solved by this invention concerns the containment of the blast energy. If the porous, wetted wall is thick enough to contain the blast, then internal heating will lead to excessive temperatures; also, the breeding ratio in the blanket will be reduced to an unacceptable level. Therefore, the wall must be thin—the momentum from the blast is transmitted through the relatively incompressible lithium behind the wall to a main pressure vessel which is thick enough to contain the energy. This pressure vessel is placed inside the lithium blanket at a location where the breeding ratio is not significantly affected.

This configuration of main vessel and wetted wall poses another design problem. The pressure waves reverberating between these two walls result in inward motion of the wetted wall. Because this wall is to thin to restrain the motion, another inner wall is needed between the pressure vessel and the wetted wall, with sufficient thickness to restrain the inward motion yet not thick enough to prohibitively reduce the breeding ratio.

The blast-containing design thus evolves into a system with at least three walls:

An innermost porous wall which is thin and allows the passage of lithium to form a protective coating on the inside surface.

A main pressure-vessel wall, thick enough to restrain the internal pressures in the cavity and blanket, located deep enough into the blanket so that it does not seriously affect the breeding ratio.

An inner structural wall located between the former two walls which is thick enough to restrain the inward motion and thin enough so that it still permits an adequate breeding ratio.

In the design of these walls, the strains and corresponding stresses must be limited to values which would not exceed the fatigue limits of the materials used. Therefore, careful design and analysis are necessary to minimize the motions of these walls.

A lithium flow path is chosen which introduces the return lithium (from the primary loop) at the surface of the porous wetted wall and forces it to flow radially outward through the blanket. Thus the wetted wall is exposed to the lowest temperature in the primary lithium loop. This temperature is chosen to be 400° C, which is well above the lithium melting point of 186° C but is within the acceptable range for ferritic stainless steels. The use of stainless steel reduces the cost of the vessel. Maintaining the inner wall at the minimum loop temperature also reduces the mass transport of wall material by the flowing lithium to other parts of the loop and ensures that the lithium coating the inner surface is relatively cool with a low vapor pressure; therefore, the lithium vapor density in the cavity prior to the blast is minimized. (The vapor pressure of lithium at 400° C is ~ $10^{-4}$ Torr which should be well below the cavity vacuum required for passage of the laser pulse.) The temperature attained by the lithium flowing from the outer portion of the blanket to the heat exchanger is dependent upon the blanket thermal power and upon the lithium flow rate. For this temperature, a value of 750° C (1,380° F) was arbitrarily chosen to be compatible with existing steam technology.

GENERAL DESCRIPTION

Figure 1:
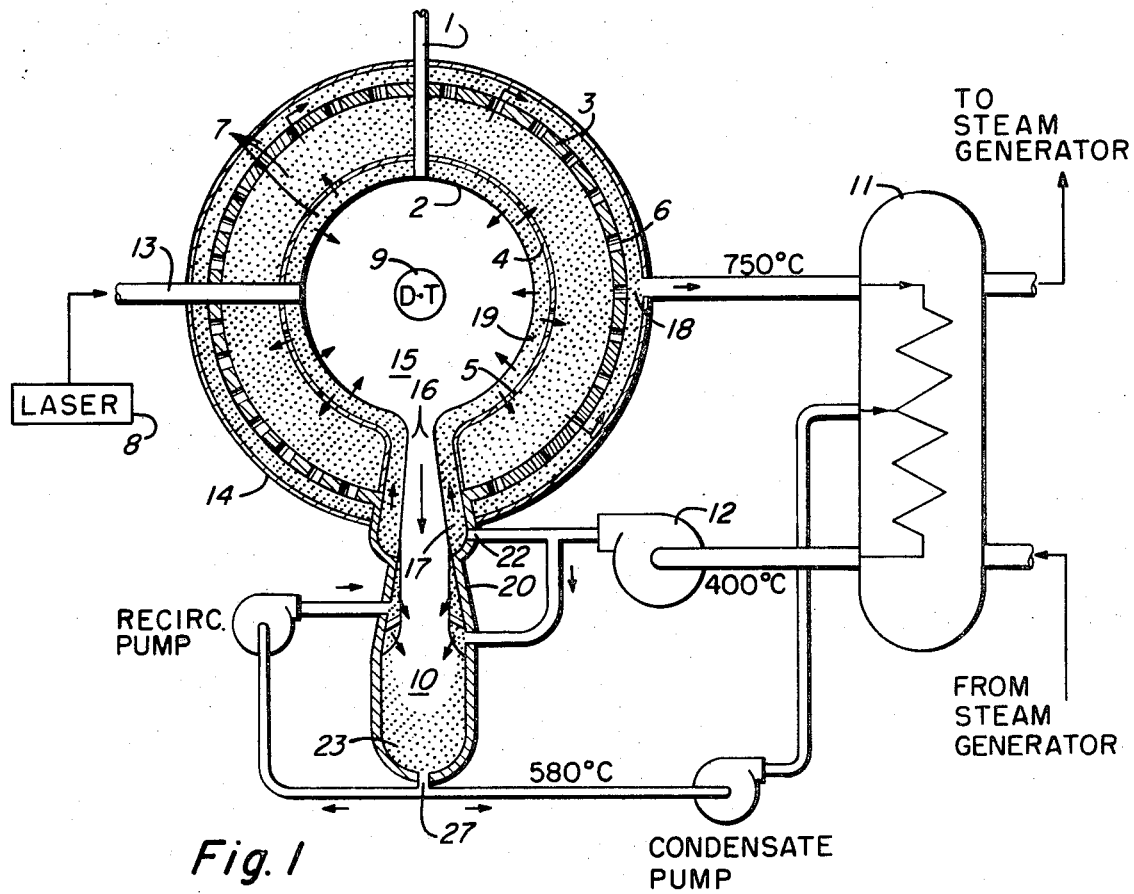
FIG. 1 is a schematic drawing in partial cross section of one embodiment of this invention.
Figure 2:
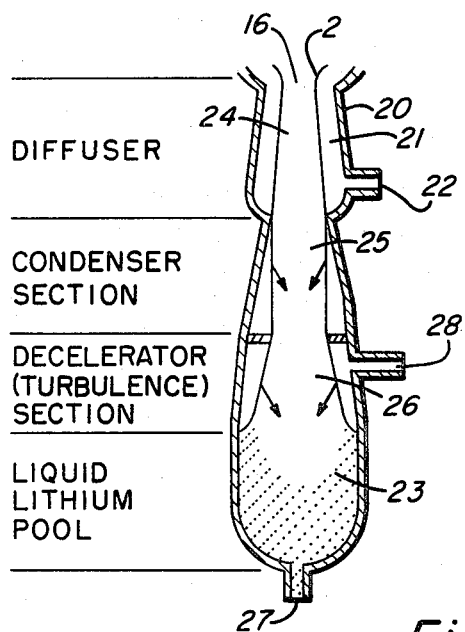
FIG. 2 is an enlarged schematic view in partial cross section of the spray condenser shown in FIG. 1.

A schematic of the wetted-wall reactor is shown in FIG. 1. The pellet 9 containing D+T in equal amounts is injected through a port 1 which penetrates the blanket 7 and is initiated at the center of the cavity 15 by a laser 8; the cavity 15 is defined by the wetted wall 2 located at a radius of 1.0 meter from the center. The subsequent D+T burn releases 200 MJ of energy. Within fractions of a microsecond, 50 MJ is deposited within the pellet 9 and 152.5 MJ is generated within the blanket lithium 7 and structural materials. Within ~ 0.5 millisec the pressure pulses generated by the interaction of the pellet 9 with the lithium at the wetted wall 2 have subsided. Within the next few milliseconds, the cavity conditions are equilibrated, ~ 1.6 kg of lithium are vaporized from the protective layer at the wall, and sonic flow conditions of the cavity gases are established at the outlet port 16. As shown in FIG. 2, the flow of hot gases through the cavity outlet port 16 is expanded in a diffuser 24 to supersonic conditions and the gases are then condensed in a downstream length of duct 25 where a finely atomized spray of liquid lithium is injected. The spray of atomized droplets is recirculated from the liquid pool 23 by means of port 27 and a recirculating pump at the bottom of the condenser 10. Downstream of the condenser duct 25 the mixture of gas and liquid droplets, still at supersonic velocity, enters a decelerator section 26 and is decelerated by turbulent mixing created by a spray of large lithium droplets. The coarse droplet spray is provided from a side stream port 28 of the 400° C return flow from the heat exchanger 11. The kinetic energy of this mixture is finally absorbed by impacting with a pool of liquid lithium 23 at the bottom of the condenser system 10. After ~ 0.2 sec, the pressure within the cavity 15 decreases to less than atmospheric, and the blowdown continues during the remaining 0.8 sec of the pulse cycle, reducing the cavity pressure to 1.00 millimeter Hg. The cycle is then repeated with the initiation of another pellet 9. The energy deposited within the blanket 7 is removed by circulating the lithium through an external heat exchanger 11. Lithium, flowing at 400° C from the heat exchanger, is returned by means of pump 12 and port 22 to a plenum 17 between the 1-cm-thick wetted wall 2 and the 5-cm-thick inner structural wall 4, which serves to restrain the movement of the inner blanket boundary caused by the pressure waves generated within the blanket 7 and the cavity pressure shell. Located a few centimeters behind the wetted wall 2, the inner structural wall 4 also serves as a flow baffle for distributing the radial outflow. The wetted wall 2 moves along with the structural wall 4 through hydrodynamic coupling and, if needed, through mechanical attachments. The 10-cm-thick main pressure vessel shell 3, located 1.7 meters from the center of the spheres, is the outer restraint for the reactor. This shell 3 is stressed by the shock loads from the pressure pulses generated within the cavity 15 and within the blanket 7. The radial outflow of lithium collects in a plenum 18 defined by the outermost shell 14 at 2 meters from the center, and returns to the heat exchanger 11 at 750° C. Paths for pellet injection and for the laser pulse are provided by small ports 1 and 13, respectively, penetrating the blanket 7. The diffuser 20 for the expulsion of cavity gases provides the main structural support for the system of spherical shells.

The minimum power level is based on a thermal input of ~ 200 MW from one reactor. Higher power levels may be obtained by combining several reactors in a reactor system, thereby increasing both the versatility and the overall ratio of actual operating power to full design power. The nominal thermal power level for a conceptual plant was arbitrarily chosen to be ~ 2,000 MW, requiring ten modular reactors as described herein. The intermediate heat exchanger 11 is placed between the tritium-containing lithium and the steam generator(s) to reduce the possibility of tritium leaking into the steam-plant components. The circulating fluid between the intermediate heat exchanger and the steam generator(s) will be determined by engineering design criteria. The steam cycle for this power plant is based on a conventional double-steam-reheat design, sized for a thermal input of ~ 2,000 MW. The exit steam from the high-pressure and intermediate-high-pressure turbines is reheated prior to expanding through the succeeding turbine to increase the thermodynamic efficiency of the expansion. Mechanical-draft dry-cooling towers are used to reject waste heat, thus rejecting heat to the atmosphere rather than directly to natural water sources. The performance characteristics of this power plant are:

Thermal power generated, MW 2025
Gross alternator output, MW 945
Steam-plant operating power, MW 48
Net steam-plant electrical output, MW 897
Net steam-plant efficiency, % 44.3
Reactor plant operating power, MW 72
Net station electrical send-out, MW 825
Net overall plant efficiency, % 40.7

The steam-plant operating power includes the requirements for boiler feed pumps, cooling-water pumps, cooling tower draft fans, and other auxiliaries, and the reactor plant operating power includes the requirements for lithium pumps 12, vacuum pumps, the laser 8, and other auxiliaries.

Protection from the initial high pellet-energy fluxes is afforded by the formation of a layer of liquid lithium on the inside surface of the wall prior to the initiation of the energy pulse. The minimum thickness of this layer is determined by that amount of lithium that could be vaporized by the deposited pellet energy (50 MJ); this amount of lithium is ~ 2.5 kg corresponding to a layer thickness of ~ 0.4 millimeter. The interaction between the pellet and wetted wall layer indicate that only ~ 0.5 kg of lithium is vaporized during the initial interaction period of ~ 1.0 millisec. The layer is formed on the inside surface of the wetted wall 2 by accumulation of the radial inflow of blanket lithium 7 through the porous wall 2. It is assumed that the flow impedance within the wall can be tailored for any desired flow distribution. During the pulse cycle this flow will cease until the cavity pressure decreases below the blanket pressure which is assumed to be of the order of 1 atm. The cavity pressure decreases to less than 1.0 atm at ~ 0.2 sec after pulse initiation; therefore, ~ 0.8 sec is available for the formation of the layer.

The porous wetted wall 2 is formed into a wire-woven shell similar to a series of screens which are tightly woven together. A second method of making the wetted wall porous is to highly sinter the metal so that is has pores and permeability sufficient to allow lithium to pass through the metal. Among the materials the inventor has found suitable for the wetted wall 2, inner wall 4, pressure vessel 6, and outer shell 14 are the austenitic stainless steels, the refractory metals, in particular, titanium, zirconium, and niobium, iron-chromium alloys, and pure iron. The inventor has calculated that the thicknesses of each of the walls using austenitic stainless steel are as follows:

Porous Wetted Wall 2 1 cm (Highly sintered)
Inner Wall 4 5 cm
Pressure Vessel 3 10 cm
Outer Shell 14 2½ cm The thicknesses for other materials such as niobium would be somewhat greater, while for zirconium it would be less than stainless steel.

The outer-wall surface must be cooled by the flowing lithium within the plenum 19 between the wetted wall and the inner structural wall; otherwise, the wall material may overheat. The inside surface is cooled by vaporization of the protective lithium layer, but it may not be at the same temperature as the outside surface. The thicknesses of the inner and outer (main-pressure-vessel) structural walls are too large for conduction of the deposited heat to the inner and outer wall surfaces. Therefore, this heat must be removed by the lithium that flows through the walls by means of ports 5 in the inner wall and ports 6 in the main structural wall. The passages 5, 6 for this lithium flow are arranged uniformly over the spherical surface and the dominant temperature gradients will be tangential between the passages. A conventional design for such passages is a triangular array of holes, passing radially through the walls 3, 4. The structural design criteria for these passages will be to limit the thermal stresses resulting from the temperature gradients and to limit the void fraction so that the wall strength is not impaired. A temperature gradient of 50° K is easily accommodated. For the inner wall 4, a coolant port 5 having a diameter of 0.25 cm and a void fraction of 0.05, corresponding to a spacing of 1.06 cm between centers, will fulfill these criteria. For the outer wall (pressure shell) 3, a 0.9-cm-diam port 6 and a void fraction of 0.05 gives a 50° K-gradient and a hole spacing of 3.8 cm. Because the cooling of the inner and outer structural walls is by conduction to the lithium flowing through these walls, it is essential that this flow be uniformly distributed around the sphere. This is accomplished by making the flow impedance such that the pressure losses through the wall are significantly higher than the total pressure changes within the lithium blanket regions.

For the laser-driven fusion reactor, an electrically-pumped gas laser 8 is the most practical. A specific example is the $CO_2$ lasers which operate in the range of $10^5$ to $10^6$ J required to achieve sufficient energy return for economic operation of a commercial power plant. In an electrically pumped $CO_2$ system, the entire energy input is electrical, thus offering the option of obtaining the pumping power directly from the output of the fusion power plant. Between each shot the electrical energy in the capacitor storage bank (or a combination capacitive-inductive storage system) is replenished from the generated power of the system. In addition, a $CO_2$ laser system has the singular advantage that the gas is directly reusable after the excess energy residing in it is removed by cooling. Thus, a closed-cycle flowing-$CO_2$ laser 8 utilizing electron-beam-controlled electrical discharge for pumping would appear to be the preferred lasing apparatus. For the power plant, the laser efficiency is assumed to be 10 percent, requiring 100 MW of power to drive the laser that would produce 10 1.0-MJ pulses each second. These pulses would then initiate fusion pellets in 10 200-MW fusion reactors at a rate of once per second in each reactor. If it is further assumed that 95 percent of the 90 MW of waste heat from the laser system can be returned to the steam plant for reconversion into electricity at the steam-plant efficiency of 44.3 percent, the net power to operate the laser is 62.1 MW.

In summary, the reactor of this invention is directed to a D+T fusion reaction releasing 200 MJ of energy per pulse at the center of a spherical cavity 15 of 1-meter radius. The sphere is evacuated to a pressure of < 1 millimeter Hg of lithium vapor. Energy pulses are released at the rate of 1 per second. The boundary of the cavity is defined by a thin wall 2 of porous metal, surrounded by a 1-meter-thick spherical-shell blanket 7 of liquid lithium. Before release of each energy pulse, liquid lithium is diffused through the wall to wet the inside surface of the sphere to a depth of ~ 1 millimeter. This lithium, which is vaporized by the energy release, is heated to a temperature of ~ 4,000° K and a pressure of ~ 20 bar. The vapor escapes through a nozzle port 16 (throat diameter, ~ 20 cm), which extends through both the wall and the blanket, and is condensed in a supersonic liquid spray condenser 10. After 1 second, when the pressure in the sphere has been reduced again to < 1 millimeter Hg, another D+T filled pellet 9 is injected through a small port 1 and initiated by a laser pulse. Electrical energy is generated by a conventional steam plant operating at a top temperature of 600° C. The bulk of the thermal energy to power the steam cycle is derived from the fast-neutron energy deposited in the spherical blanket of liquid natural lithium surrounding the pulse-reaction cavity. The heated liquid lithium in the blanket is pumped through a primary heat-exchange loop, which operates at a peak temperature of 750° C. Additional heat energy is obtained from the lithium-spray condenser system 10.

What I claim is:

1. An improved laser-driven fusion power reactor having a liquid lithium blanket surrounding an inner cavity into which is injected a D+T pellet, said pellet being caused to fuse by a laser pulse impinging on said pellet, and the blanket being contained within at least three structural spherical walls, the improvement consisting of a thin porous spherical wall of metal which defines the said cavity and allows the migration of the lithium to wet the innermost surface of said wall, said blanket being connected to a pump and heat exchanger means and in fluid communication with the inner wall and main pressure vessel wall, and the cavity being connected by means of a port to a supersonic lithium spray condenser system having pump and heat exchanger means.

2. The reactor of claim 1 in which the said porous wall and the structural walls are composed of a material selected from the class consisting of austenitic stainless steel, zirconium, niobium, iron-chromium alloys, and pure iron.

3. The reactor of claim 2 in which the said material is austenitic stainless steel.

4. The reactor of claim 3 in which the porous wall is composed of a highly sintered austenitic stainless steel.

5. The reactor of claim 1 in which there are four spherical walls, the innermost being a porous wall of about 1 cm thick, an inner wall 5 cm thick, a main pressure wall of 10 cm thick, and an outer wall 2½ cm thick.

6. The reactor of claim 1 in which said spray condenser system consists of a diffuser means in fluid communication with the cavity and being connected to a condenser means which is in fluid communication with a decelerator means which is in communication with a liquid pool means, and said pool means being connected to recirculating and condensate pumps.

* * * * *